US012528291B2

(12) United States Patent
Hammura et al.

(10) Patent No.: US 12,528,291 B2
(45) Date of Patent: Jan. 20, 2026

(54) LIQUID EJECTION HEAD AND LIQUID EJECTION APPARATUS

(71) Applicant: CANON KABUSHIKI KAISHA, Tokyo (JP)

(72) Inventors: Akiko Hammura, Tokyo (JP); Yoshiyuki Nakagawa, Kanagawa (JP); Takuro Yamazaki, Tokyo (JP); Atsushi Teranishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 106 days.

(21) Appl. No.: 18/126,674

(22) Filed: Mar. 27, 2023

(65) Prior Publication Data

US 2023/0311500 A1 Oct. 5, 2023

(30) Foreign Application Priority Data

Mar. 30, 2022 (JP) ................................ 2022-056988
May 19, 2022 (JP) ................................ 2022-082365

(51) Int. Cl.
*B41J 2/14* (2006.01)

(52) U.S. Cl.
CPC .. *B41J 2/14201* (2013.01); *B41J 2002/14419* (2013.01)

(58) Field of Classification Search
CPC .......... B41J 2/14201; B41J 2002/14419; B41J 2002/14459; B41J 2202/12; B41J 2/14233
See application file for complete search history.

(56) References Cited

U.S. PATENT DOCUMENTS 10,245,841 B2 4/2019 Asaka et al.
10,981,382 B2 4/2021 Yoshida
(Continued)

FOREIGN PATENT DOCUMENTS

EP 1 645 416 A2 4/2006
JP 2019-155909 A 9/2019
(Continued)

OTHER PUBLICATIONS

U.S. Appl. No. 18/126,687, Yoshiyuki Nakagawa Takuro Yamazaki Akiko Hammura Atsushi Teranishi, filed Mar. 27, 2023.
(Continued)

*Primary Examiner* — Lisa Solomon
(74) *Attorney, Agent, or Firm* — Venable LLP

(57) ABSTRACT

A liquid ejection head includes: an array of ejection ports; pressure chambers corresponding respectively to and communicating with the ejection ports; individual supply channels and individual collection channels communicating with the chambers; a common supply channel communicating with surfaces of the individual supply channels opposite to surfaces thereof communicating with the chambers; a common collection channel communicating with surfaces of the individual collection channels opposite to surfaces thereof communicating with the chambers; and a damper member forming a wall of a part of a channel in the common collection channel. A wall of a part of a channel in the common supply channel is not formed by the damper member. The common supply channel and the common collection channel are formed so as to extend in a first direction along the ejection port array, and are disposed side by side in a second direction crossing the ejection port array.

17 Claims, 9 Drawing Sheets

(56) References Cited

U.S. PATENT DOCUMENTS

| | | | | |
|---|---|---|---|---|
| 2019/0275797 | A1 | 9/2019 | Kato | |
| 2020/0147961 | A1* | 5/2020 | Yoshida | B41J 2/14201 |
| 2020/0238696 | A1 | 7/2020 | Yoshida | |

FOREIGN PATENT DOCUMENTS

| | | | |
|---|---|---|---|
| JP | 2020-078893 | A | 5/2020 |
| WO | 2017/047534 | A1 | 3/2017 |

OTHER PUBLICATIONS

U.S. Appl. No. 18/126,664, Akiko Hammura Yoshiyuki Nakagawa Takuro Yamazaki Atsushi Teranishi, filed Mar. 27, 2023.
U.S. Appl. No. 18/125,220, Takuro Yamazaki Yoshiyuki Nakagawa Akiko Hammura Atsushi Teranishi, Mar. 23, 2023.
Office Action dated Oct. 30, 2025, in Chinese Patent Application No. 202310309558.7.

* cited by examiner

LIQUID EJECTION HEAD AND LIQUID EJECTION APPARATUS

BACKGROUND OF THE INVENTION

Field of the Invention

The present disclosure relates to a liquid ejection head and a liquid ejection apparatus.

Description of the Related Art

In liquid ejection heads that eject liquids, a phenomenon called crosstalk occurs in which a pressure fluctuation occurs in response to ejection of the liquid and this pressure fluctuation propagates to other pressure chambers through liquid channels and affects ejection characteristics. The crosstalk causes a fluctuation in ejection speed or ejection volume and may adversely affect images.

As means for suppressing such crosstalk, a configuration has been known in which liquid channels are provided with dampers to absorb pressures. To achieve a sufficient crosstalk suppression effect, the areas of the dampers are required to be sufficiently wide. Incidentally, in recent years, the ejection ports in liquid ejection heads are required to be dense in order to obtain high image quality. The more densely the ejection ports are disposed, the greater the effect of the crosstalk becomes, and the wider the damper areas are required to be.

Japanese Patent Laid-Open No. 2019-155909 (hereinafter referred to as Document 1) discloses a liquid ejection head in which ejection ports are arrayed in the longitudinal direction of a substrate to thereby form ejection port arrays. Also, a rectangular pressure chamber is provided for each ejection port. For each pressure chamber, an individual supply channel and an individual collection channel are disposed. The individual supply channels and the individual collection channels communicate with branched common supply channels and branched common collection channels. In Document 1, the branched common supply channels and the branched common collection channels extend in the transverse direction of the substrate. Also, the branched common supply channels and the branched common collection channels are disposed alternately in the longitudinal direction of the substrate, in which the ejection port arrays extend. In Document 1, part of the walls of these brandied channels serves as dampers and absorbs pressures from the pressure chambers to thereby suppress crosstalk.

In the configuration disclosed in Document 1, the length of the dampers is limited since they extend in the transverse direction of the substrate. This leads to a problem that a sufficient damping effect cannot be achieved and the crosstalk suppression effect is therefore low. Assume that each branched common channel in Document 1 is made longer, thereby making the substrate longer in the transverse direction, in order to achieve a damping effect. In this case, there is a possibility that the pressure loss in each branched common channel may be so large that the ink cannot be properly supplied. Also, in Document 1, the dampers are disposed at both the branched common supply channels and the branched common collection channels. Accordingly, the damper width is narrow; thus making it impossible to achieve a sufficient damping effect.

SUMMARY OF THE INVENTION

A liquid ejection head according to an aspect of the present disclosure includes: an ejection port configured to eject a liquid; an ejection port array being an array of a plurality of the ejection ports; a plurality of pressure chambers corresponding respectively to the plurality of ejection ports and communicating with the ejection ports; a plurality of individual supply channels corresponding respectively to the plurality of pressure chambers and communicating with the pressure chambers; a plurality of individual collection channels corresponding respectively to the plurality of pressure chambers and communicating with the pressure chambers; a common supply channel communicating with the plurality of individual supply channels, the common supply channel communicating with surfaces of the individual supply channels opposite to surfaces thereof communicating with the pressure chambers; a common collection channel communicating with the plurality of individual collection Channels, the common collection channel communicating with surfaces of the individual collection channels opposite to surfaces thereof communicating with the pressure chambers; and a damper member forming a wall of a part of a channel in the common collection channel. A wall of a part of a channel in the common supply channel is not formed by the damper member, the common supply channel and the common collection channel are formed so as to extend in a first direction along the ejection port array, and the common supply channel and the common collection channel are disposed side by side in a second direction crossing the ejection port array.

Further features of the present invention will become apparent from the following description of exemplary embodiments with reference to the attached drawings.

DESCRIPTION OF THE EMBODIMENTS

Preferred embodiments of the present disclosure will be specifically described with reference to the accompanying drawings. Note that the following embodiments do not limit the contents of the present disclosure, and not all of the combinations of the features described in the following embodiments are necessarily essential for the solution provided by the present disclosure.

First Embodiment

A liquid ejection head and liquid ejection apparatus according to a first embodiment will be described below with reference to the drawings. In the present embodiment, a liquid ejection head and inkjet printing apparatus that eject inks will be described as an example, but the present embodiment is not limited to this example. The liquid ejection head and liquid ejection apparatus according to the present disclosure are applicable to apparatuses such as printers, copiers, facsimile machines having a communication system, and word processors having a printer unit, as well as industrial printing apparatuses combining various processing apparatuses. For example, the liquid ejection head and liquid ejection apparatus according to the present disclosure are usable in applications such as fabrication of biochips and printing of electronic circuits. Also, the liquids to be ejected are not limited to inks.

<General Description of Printing Apparatus>

Figure 1:
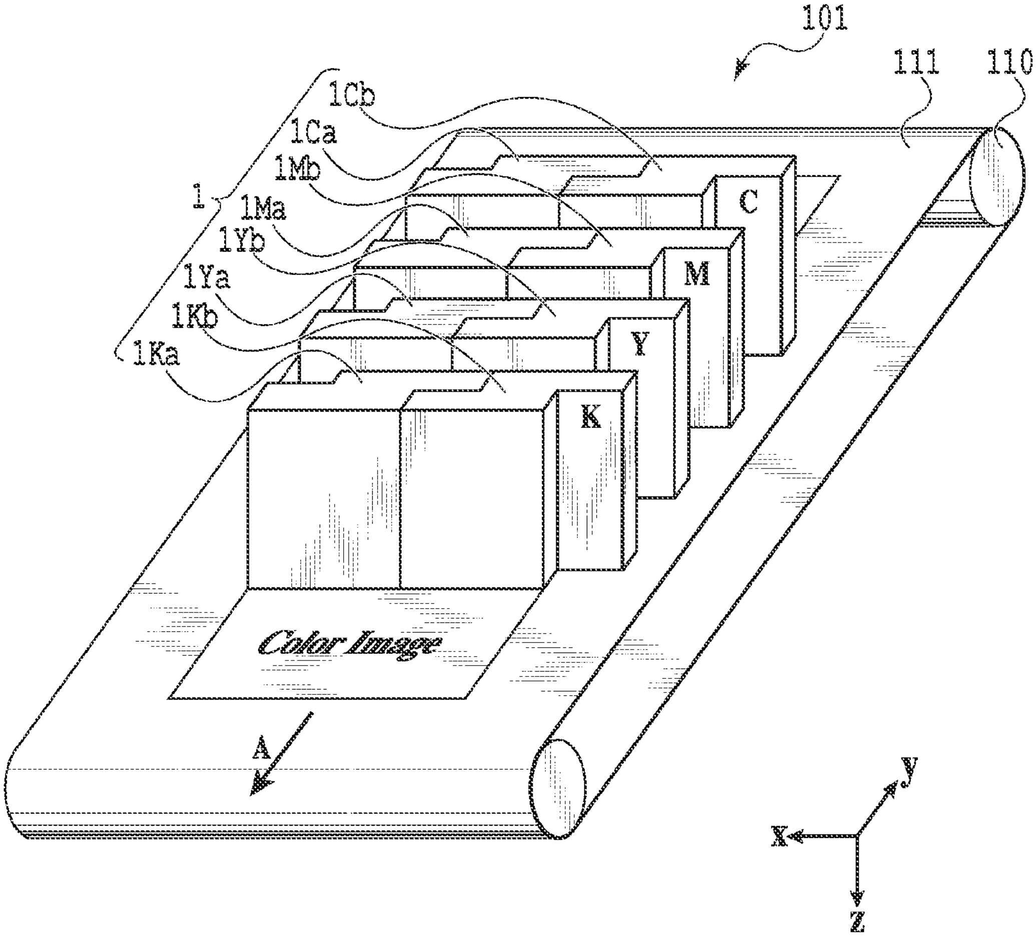
FIG. 1 is a view schematically illustrating a printing apparatus.

FIG. 1 is a view schematically illustrating a printing apparatus 101 representing an example of the liquid ejection apparatus in the present embodiment. The printing apparatus 101 in FIG. 1 has one-pass liquid ejection head modules 1 (hereinafter referred to as "liquid ejection heads 1") that print an image on a print medium 111 while moving the print medium 111 once. Ejection ports (referred to also as "nozzles") are arrayed on the sides of the liquid ejection heads 1 over the entire width of the print medium 111. The liquid ejection heads 1 in the present embodiment are heads supporting four colors of cyan (C), magenta (M), yellow (Y), and black (K). More specifically, the liquid ejection heads 1 include liquid ejection heads 1Ca and 1Cb for a cyan (C) ink and liquid ejection heads 1Ma and 1Mb for a magenta (M) ink. The liquid ejection heads 1 further include liquid ejection heads 1Ya and 1Yb for a yellow (Y) ink and liquid ejection heads 1Ka and 1Kb for a black (K) ink. The print medium 111 is conveyed in the direction of the arrow A by a conveyance unit 110, and printing is performed thereon by the liquid ejection heads 1. Note that the printing apparatus 101 illustrated in FIG. 1 is a mere example, and may be configured such that one or more liquid ejection heads 1 in any form are mountable thereon. For example, the printing apparatus 101 may have only one type of liquid ejection head or a plurality of types of liquid ejection heads other than the four types.

<Configuration of Liquid Ejection Head>

Figure 2A:
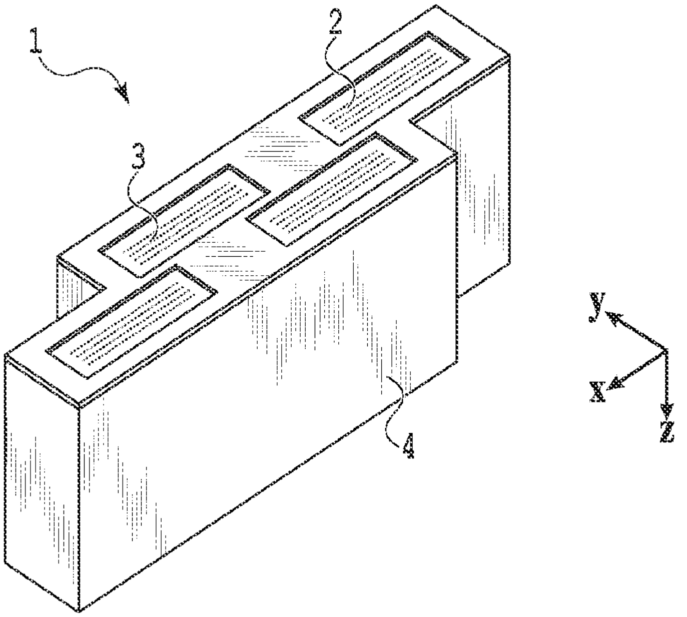
FIGS. 2A to 2C are views explaining a liquid ejection head.
Figure 2B:
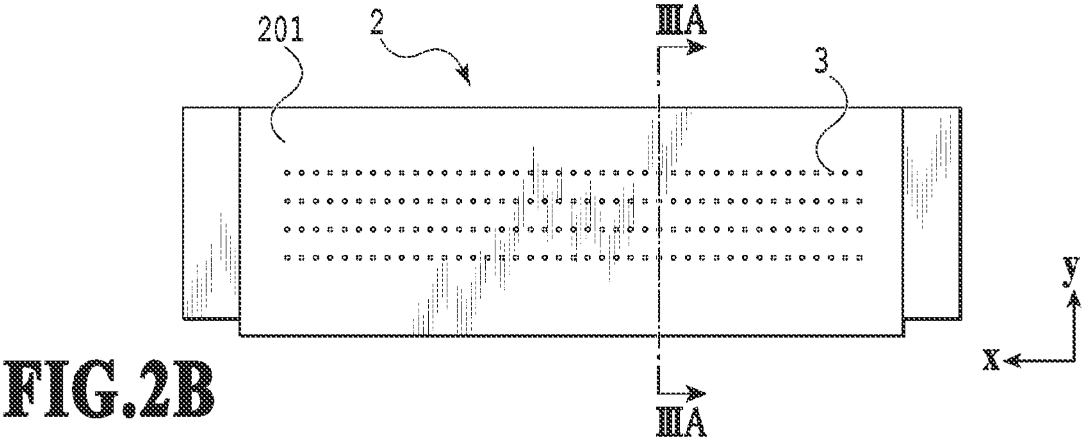
Figure 2C:
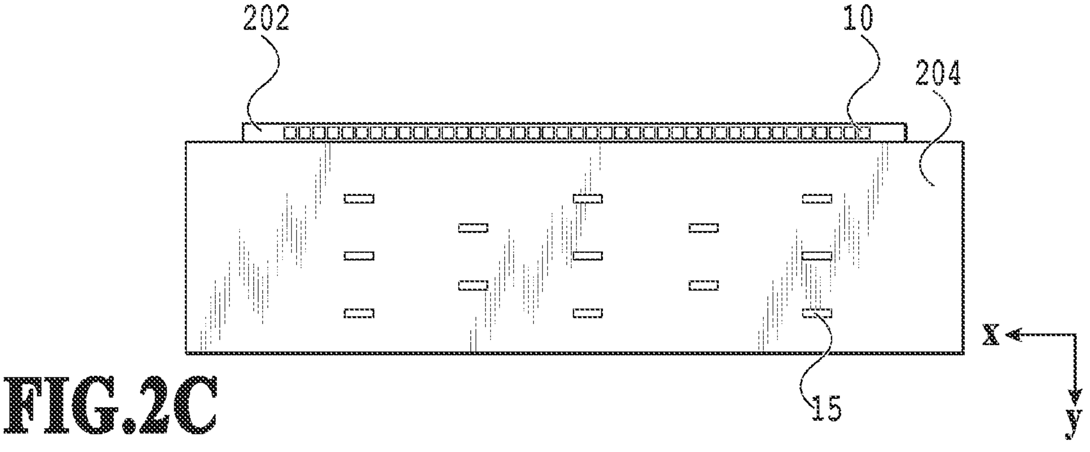

FIGS. 2A to 2C are views explaining a liquid ejection head 1 in the present embodiment. FIG. 2A is a perspective view of the liquid ejection head 1 for any one of the colors illustrated in FIG. 1. The liquid ejection head 1 has a head main body 4. In the head main body 4, a plurality of liquid ejection substrates 2 are disposed (four liquid ejection substrates 2 are disposed in FIG. 2A). Each liquid ejection substrate 2 includes a plurality of ejection ports 3. The ink to be ejected from the liquid ejection head 1 is supplied to the liquid ejection substrates 2 from an ink tank (not illustrated) through a common supply port (not illustrated) in the head main body 4. The liquid ejection substrates 2 are disposed such that end portions of arrays of ejection ports 3 extending in an X direction overlap one another as viewed in a Y direction. Disposing the liquid ejection substrates 2 in this manner enables printing with long ejection port arrays.

FIG. 2B is a view of the liquid ejection substrate 2 as seen from the ejection ports 3 side. FIG. 2C is a view of the liquid ejection substrate 2 as seen from the opposite side to the ejection ports 3 side. The liquid ejection substrate 2 is configured of a plurality of substrates. As illustrated in FIG. 2B, the liquid ejection substrate 2 includes an ejection port formation substrate 201, The ejection ports 3 are formed in the ejection port formation substrate 201. The ejection ports 3 are disposed along the longitudinal direction (X direction, first direction) of the liquid ejection substrate 2 (ejection port formation substrate 201) and form an ejection port array. In the ejection port formation substrate 201, a plurality of such ejection port arrays, which extend in the longitudinal direction of the substrate, are disposed side by side in a direction crossing the direction along the ejection port arrays, i.e., the transverse direction of the substrate (Y direction, second direction). As illustrated in FIG. 2C, a channel formation substrate 204 is provided on the side of the liquid ejection substrate 2 opposite to its side where the ejection ports 3 are formed. A plurality of connection channels 15 are formed in the channel formation substrate 204. Each liquid ejection head 1 in the present embodiment is configured to circulate the ink therethrough. The ink is supplied to and collected from the liquid ejection substrate 2 through the connection channels 15 formed in the channel formation substrate 204. The ink supplied to the liquid ejection substrate 2 passes through channels inside the substrates and is ejected from the ejection ports 3 and applied to the print medium 111. In the head main body 4, there is disposed an electric substrate (not illustrated) for supplying electric power and signals necessary for ejection from the ejection ports 3. This electric substrate is connected to terminals 10 on each liquid ejection substrate 2 by wirings (not illustrated). Note that the example explained in FIGS. 2A to 2C is also a mere example of the present embodiment, and the liquid ejection head 1 can be configured in any form.

<Configuration of Liquid Ejection Substrate>

Figure 3A:
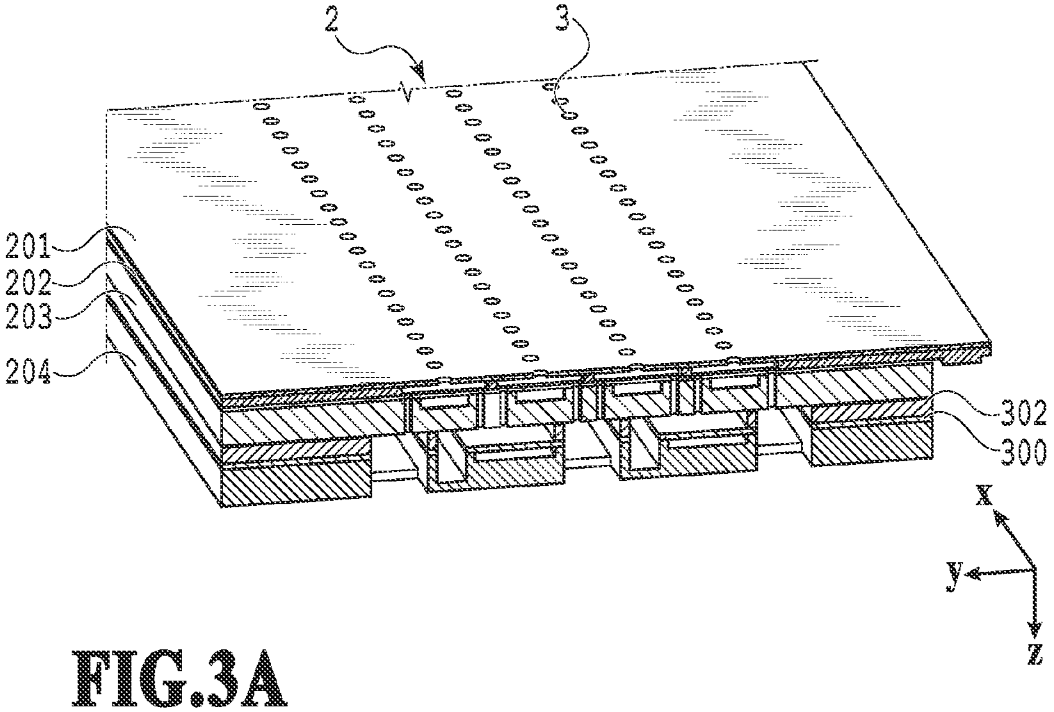
FIGS. 3A and 3B are views explaining a liquid ejection substrate.
Figure 3B:
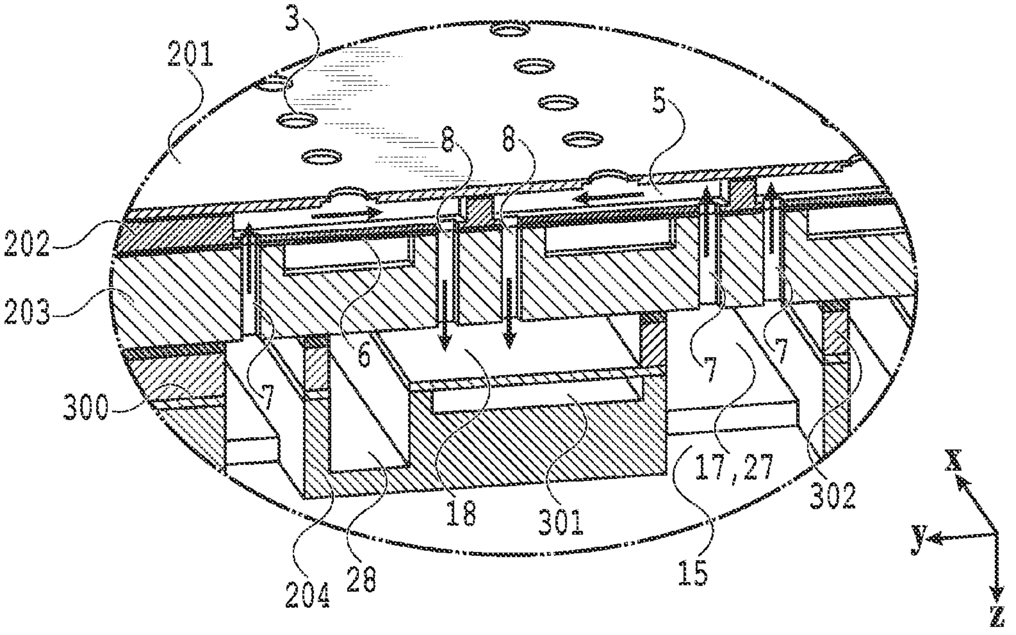

FIGS. 3A and 3B are views explaining a liquid ejection substrate 2 in the present embodiment. FIG. 3A is a view illustrating a cross-sectional view along the IIIA-IIIA line in FIG. 2B. FIG. 3B is an enlarged view of some ejection ports in FIG. 3A and their surroundings.

As illustrated in FIG. 3A, each liquid ejection substrate 2 in the present embodiment is formed as a laminate structure of a plurality of substrates. Specifically, the liquid ejection substrate 2 has five substrates—the ejection port formation substrate 201, a vibration substrate 202, a liquid supply substrate 203, the channel formation substrate 204, and a damper substrate 302. The liquid ejection substrate 2 is formed by affixing the damper substrate 302 having a damper member 300 between the channel formation substrate 204 and the liquid supply substrate 203.

A more specific description will be given using FIG. 3B. Pressure chambers 5 communicating with the ejection ports 3 are formed in the liquid ejection substrate 2. A pressure chamber 5 is formed for each ejection port 3. Moreover, a piezoelectric element 6 is provided on a deformable wall of each pressure chamber 5 formed by the vibration substrate 202. By deforming the vibration substrate 202, the piezoelectric element 6 can pressurize the liquid in the pressure chambers 5 and eject the ink from the ejection ports 3.

In the liquid supply substrate 203, individual supply channels 7 and individual collection channels 8 communicating with the pressure chambers 5 are formed respectively for the pressure chambers 5. The ink is supplied from the individual supply channels 7 into the pressure chambers 5 and ejected from the ejection ports 3. Part of the ink can flow into the individual collection channels 8 from the pressure chambers 5. The plurality of individual supply channels 7 each communicate with a first common supply channel 17 formed in the damper substrate 302. The plurality of individual collection channels 8 each communicate with a first common collection channel 18 formed in the damper substrate 302. The wall of the first common collection channel 18 facing the individual collection channels 8 is formed by the damper member 300. Damper areas 301 are provided at positions opposed to the individual collection channels 8.

The damper areas 301 are areas by the walls where the damper member 300 is formed, and are areas forming recessed spaces in the channel formation substrate 204. In a case where a pressure fluctuation occurs, the damper member 300 can absorb the pressure by using the recessed spaces provided in the channel formation substrate 204. The first common supply channel 17 and the first common collection channel 18 extend in the longitudinal direction of the liquid ejection substrate 2. Also, a plurality of first common supply channels 17 and a plurality of first common collection channels 18 are formed alternately in the transverse direction of the liquid ejection substrate 2.

The first common supply channels 17 each communicate with a second common supply channel 27 formed in the channel formation substrate 204. A plurality of connection channels 15 are formed in the second common supply channel 27. The ink is supplied from the outside of the liquid ejection substrate 2 through these connection channels 15. The first common collection channels 18 each communicate with a second common collection channel 28 formed in the channel formation substrate 204. A plurality of connection channels 15 are formed in the second common collection channel 28. The ink is collected to the outside of the liquid ejection substrate 2 through these connection channels 15. The second common supply channel 27 and the second common collection channel 28 extend in the longitudinal direction of the liquid ejection substrate 2. Also, a plurality of second common supply channels 27 and a plurality of second common collection channels 28 are formed alternately in the transverse direction of the liquid ejection substrate 2. As illustrated in FIGS. 3A and 3B, each first common supply channel 17 and the corresponding second common supply channel 27 together form a common supply channel. Likewise, each first common collection channel 18 and the corresponding second common collection channel 28 together form a common collection channel.

The ejection port formation substrate 201, the vibration substrate 202, the liquid supply substrate 203, the channel formation substrate 204, and the damper substrate 302 can each be a silicon substrate or the like. Also, an example in which the substrates are separate substrates has been described in the present embodiment, but they are not limited to separate ones. The damper member 300 is made of an elastic material. For example, resin materials such as polyimides and polyamides are usable. The method of forming openings in the damper member 300 includes dry etching. Patterning using light exposure may be employed in a case where the damper member is a photosensitive resin.

As described above; each liquid ejection substrate 2 has: a first substrate having the ejection ports 3 formed therein (ejection port formation substrate 201); a second substrate having the pressure chambers 5 formed therein (vibration substrate 202); and a third substrate having the individual supply channels 7 and the individual collection channels 8 formed therein (liquid supply substrate 203). The liquid ejection substrate 2 further has: a fourth substrate including the damper member 300 and having the first common supply channels 17 and the first common collection channels 18 formed therein (damper substrate 302); and a fifth substrate having the second common supply channels 27 and the second common collection channels 28 formed therein (channel formation substrate 204). Moreover, the first substrate (ejection port formation substrate 201), the second substrate (vibration substrate 202); the third substrate (liquid supply substrate 203), the fourth substrate (damper substrate 302), and the fifth substrate (channel formation substrate 204) are laminated in this order.

The channel formation substrate 204 has a first surface to be laminated to the damper substrate 302 and a second surface opposite to the first surface. Moreover, the channel formation substrate 204 has through-holes penetrating through the first surface and the second surface (the portions of the connection channels 15). Furthermore, recesses that function as the damper areas 301 are formed in the first surface of the channel formation substrate 204. The through-holes and the recesses are disposed alternately in the transverse direction of the liquid ejection substrate 2 (Y direction), <Arrangement of Ejection Ports and Arrangement of Dampers>

Figure 4A:
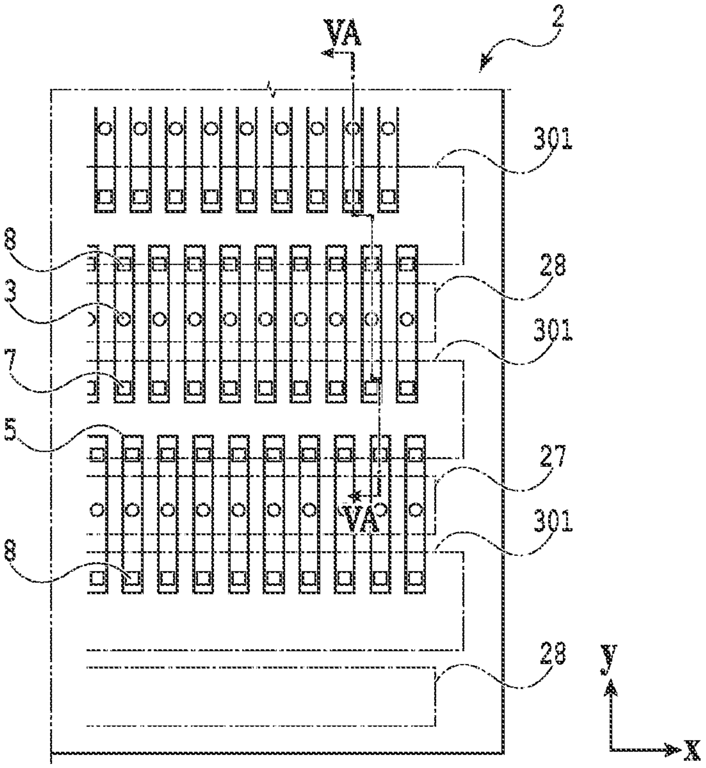
FIGS. 4A and 4B are plan views explaining channel portions in a liquid ejection substrate.
Figure 4B:
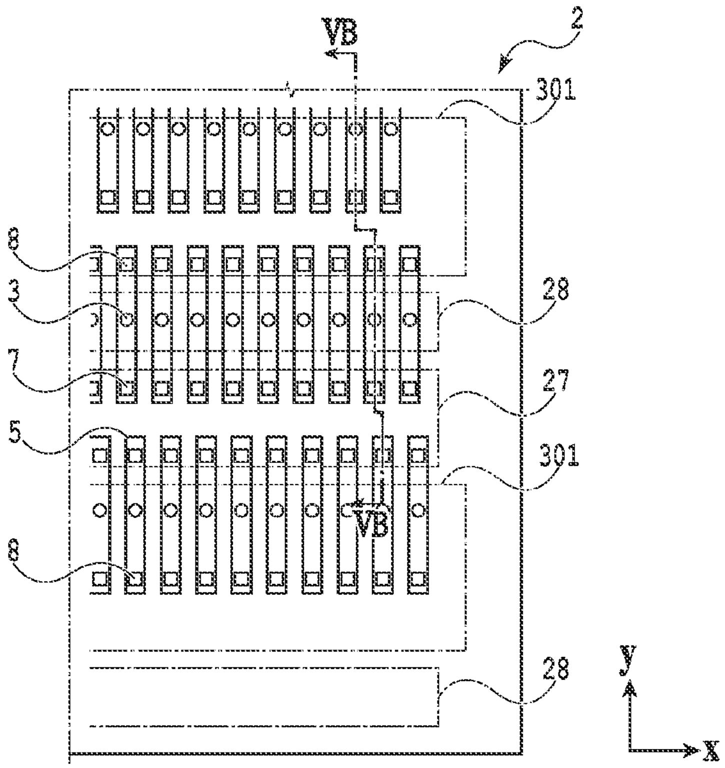

FIGS. 4A and 4B are plan views explaining channel portions in a liquid ejection substrate 2. FIG. 4A is a plan view illustrating a comparative example. FIG. 4B is a plan view illustrating the present embodiment. FIGS. 4A and 4B illustrate a part of the liquid ejection substrate 2. The longitudinal direction of the liquid ejection substrate 2 is the left-right direction in the plane of the drawing sheet (X direction). The transverse direction of the liquid ejection substrate 2 is the up-down direction in the plane of the drawing sheet (Y direction). As illustrated in FIGS. 4A and 4B, a plurality of ejection ports 3 are disposed along the longitudinal direction of the liquid ejection substrate 2, which is the X direction, and form an ejection port array. A plurality of ejection port arrays thus formed are provided in the transverse direction of the liquid ejection substrate 2 (Y direction).

Figure 5A:
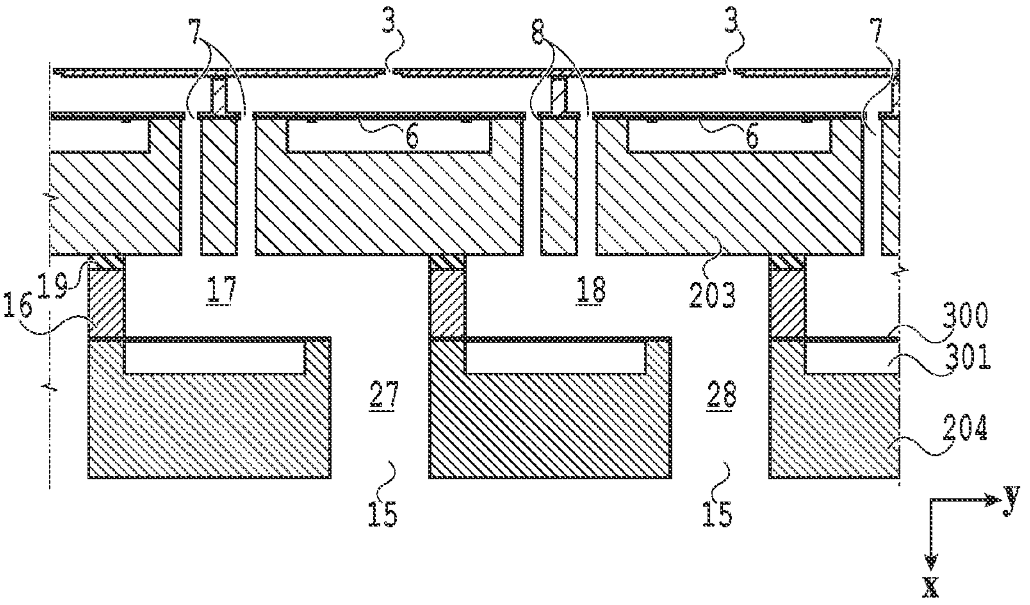
FIGS. 5A and 5B are views illustrating a cross section around ejection ports.
Figure 5B:
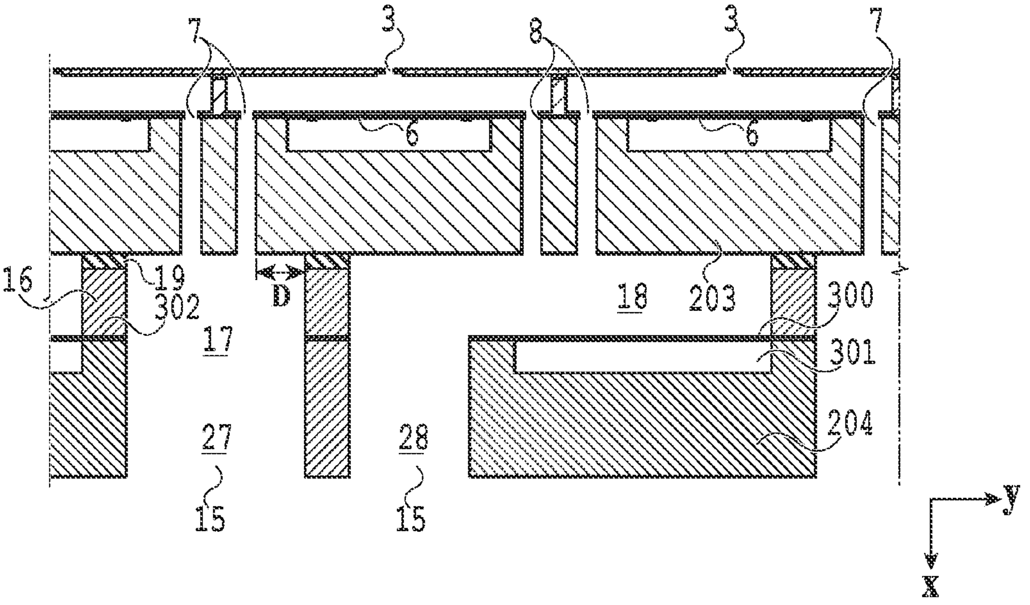

FIGS. 5A and 5B are views illustrating a cross section around ejection ports 3 in the present embodiment. FIG. 5A is a cross-sectional view illustrating the comparative example. FIG. 5B is a cross-sectional view illustrating the present embodiment. Specifically, FIG. 5A is a view illustrating a cross section indicated by the VA-VA line in FIG. 4A. FIG. 5B is a view illustrating a cross section indicated by the VB-VB line in FIG. 4B. As illustrated in FIGS. 5A and 5B, channel partitions 16, which are formed by the damper substrate 302, are provided between the first common supply channels 17 and the first common collection channels 18 in the damper substrate 302. The channel partitions 16 of the damper substrate 302 are affixed to the liquid supply substrate 203 with a bonding layer 19.

As illustrated in FIGS. 3A, 3B, and 4, the second common supply channels 27 and the second common collection channels 28 are formed so as to extend in the direction along the ejection port arrays (i.e., the longitudinal direction of the liquid ejection substrate 2). The individual supply channels 7 communicating with the pressure chambers 5 each communicate with the corresponding second common supply channel 27 through the corresponding first common supply channel 17. The individual collection channels 8 communicating with the pressure chambers 5 each communicate with the corresponding second common collection channel 28 through the corresponding first common collection channel 18. The second common supply channels 27 and the second common collection channels 28 are formed so as to extend in the direction along the ejection port arrays. This allows the pressure chambers 5 corresponding to the respective ejection ports 3 to form ejection port arrays in such a manner as to be adjacent to one another in their transverse direction. Accordingly, in each liquid ejection substrate 2 in the present embodiment, the ejection ports 3 are densely disposed.

For example, in both FIGS. 4A and 4B, the length of the pressure chambers 5 in their transverse direction (X direction in FIGS. 4A and 4B) is 110 μm, and the pressure chambers 5 and the ejection ports 3 are disposed at intervals of 150 dpi in the form of ejection port arrays. Four of such ejection port arrays are arranged so as to be offset from one another in the longitudinal direction of the pressure chamber 5 (the direction in FIGS. 4A and 4B) and to be offset from one another in the transverse direction of the pressure chamber 5 (X direction in FIGS. 4A and 4B). This arrangement enables a high ejection port density of 600 dpi on a print medium. In the present embodiment, four ejection port arrays are disposed to achieve 600 dpi. Alternatively, the configuration may be such that eight ejection port arrays are disposed to achieve 1200 dpi.

In the case where the ejection ports 3 are disposed thus densely, crosstalk may occur in which a pressure fluctuation occurring in each pressure chamber 5 propagates to other pressure chambers 5 and affects ejection characteristics. To address this, in the present embodiment, dampers are provided on walls extending in the direction along the ejection port arrays, which is the X direction. Specifically, the damper areas 301 are provided on walls of the first common collection channels 18 extending in the longitudinal direction of the liquid ejection substrate 2, the walls extending in the longitudinal direction. In this way, the damper areas 301 are large as compared to a case where the damper areas are provided in the transverse direction of the substrate, and therefore absorb pressures sufficiently. Also, the damper areas 301 are disposed on the walls of the first common collection channels 18, and no damper areas are disposed on the first common supply channels 17. Accordingly, the dampers have a sufficient width in the direction in which the ejection port arrays are disposed side by side (the Y direction in FIGS. 4A and 4B).

<Reasons for Providing Damper Areas Only on Channels on One Side>

Next, reasons for providing the damper areas 301 only on the common channels on one side in the present embodiment will be described using the comparative example illustrated in FIGS. 4A and 5A and the example of the present embodiment illustrated in FIGS. 4B and 5B. The comparative example represents an example in which the first common supply channels 17 and the first common collection channels 18 are both provided with the damper areas 301. The example of the present embodiment represents an example in which the damper areas 301 are provided only on the first common supply channels 17 or the first common collection channels 18, e.g., the first common collection channels 18.

Assume that the interval between the ejection port arrays is 1000 μm in the case where the damper areas 301 are disposed on both the first common supply channels 17 and the first common collection channels 18, as illustrated in the comparative example in FIG. 4A. If the width of each damper area 301 in the direction in which the ejection port arrays are disposed side by side (the Y direction in FIG. 4A) is approximately 500 μm and the widths of the second common supply channels 27 and the second common collection channels 28 are approximately 300 μm, the width of the partitions 16 between the channels can be 100 μm.

Assume, on the other hand, a case like the example of the present embodiment illustrated in FIG. 4A in which the damper areas 301 are provided only on the first common collection channels 18, and the interval between the ejection port arrays is 1000 ion, as in FIG. 4A. The width of the first common collection channels 18 is 1200 μm, the width of the damper areas 301 in the direction in which the ejection port arrays are disposed side by side is approximately 800 μm, the width of the second common collection channels 28 is approximately 300 μm, and the widths of the first common supply channels 17 and the second common supply channels 27 are 500 μm. In this way, the width of the partitions between the channels can be 100 μm, as in FIG. 4A.

The wider the damper width is, the smaller the compliance is and the easier the damper bends. Thus, providing a larger damper width as in the present embodiment makes it possible to form reliable damper films (damper areas 301) with high damping performance and with high damper film rigidity. Also, the larger the channel width is, the smaller the pressure loss becomes and the more stably the ink is supplied to the pressure chambers 5. In particular, the effect of the pressure loss is large in a case where the flow rate of the ink to be circulated is high. It is preferable that the channel width of the second common supply channels 27 be as large as possible since it enables the ink to be stably supplied to the pressure chambers 5. By setting the damper areas 301 only on the common collection channels or the common supply channels as described above, the width of the damper areas 301 and the widths of the common channels can be increased. In particular, by making the channel width of the common supply channels larger than the width of the common collection channels, the ink can be stably supplied to the pressure chambers 5.

Note that simply increasing the damper width and the channel widths is not preferable since it causes problems such as increasing the substrate size. Also, in a case of forming the damper areas 301 by affixing the damper member 300 to the damper substrate 302, margins to affix the damper substrate 302 and the channel formation substrate 204 are needed for each damper area 301. That is, the larger the number of damper areas 301, the larger the number of areas serving as the affixing margins. This leads to a possibility of failing to provide a sufficient damper width and sufficient channel widths. In the present embodiment, the damper areas 301 are provided only on the common channels on one side. This decreases the number of damper areas 301 and also makes it possible to provide a sufficient damper width and sufficient channel widths.

Figure 8:
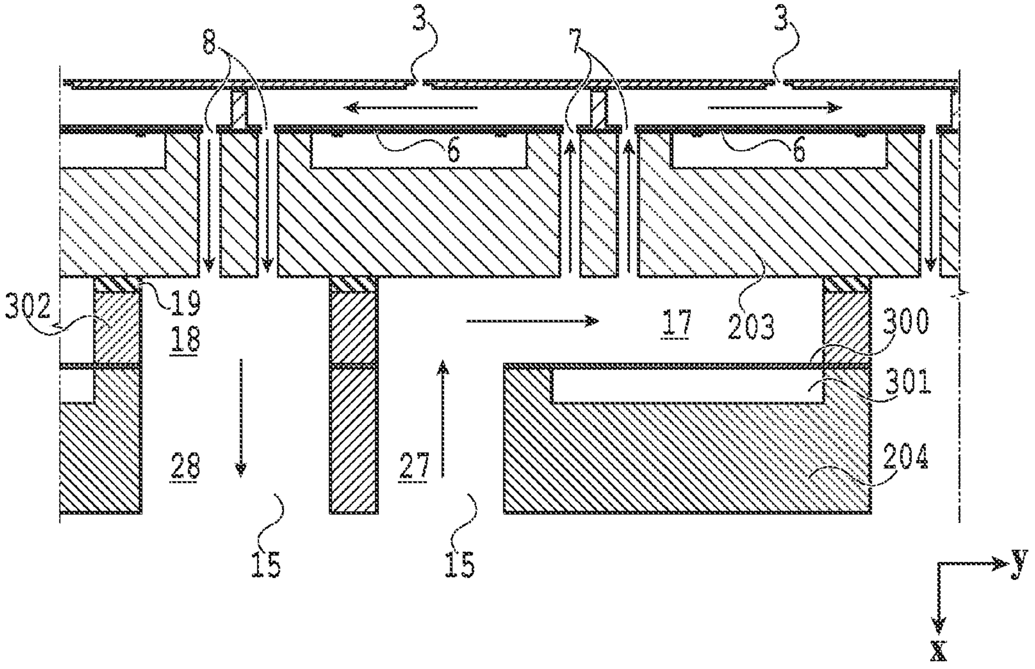
FIG. 8 is a view illustrating a cross section around ejection ports.

In the present embodiment, an example in which the damper areas 301 are provided on the first common collection channels 18 has been described. Alternatively, the configuration may be such that the damper areas 301 are provided on the first common supply channels 17. FIG. 8 is a view illustrating an example in which the damper areas 301 are provided on the first common supply channels 17, As illustrated in FIG. 8, even in the case of providing the damper areas 301 only on the common supply channel side, a sufficient damper width can still be provided and crosstalk can therefore be suppressed. Either way, by providing the damper areas 301 only on the common channels on one side, a sufficient damper width and sufficient channel widths can be provided.

In the present embodiment, the widths of the first common supply channels 17 and the first common collection channels 18 communicating with the individual channels are such that the first common collection channels 18 are wider. Thus, the damper areas 301 are provided only on the first common collection channels 18 with a wider channel width. In the present embodiment, an example in which the width of the second common supply channels 27 is larger than the width of the second common collection channels 28 has been described, as explained in the example of FIGS. 4B and 5B. However, the present embodiment is not limited to this example. The width of the second common supply channels 27 may be equal to the width of the second common collection channels 28, or smaller than the width of the second common collection channels 28.

As illustrated in FIG. 8 as a modification, the widths of the first common supply channels 17 and the first common collection channels 18 communicating with the individual channels may be such that the first common supply channels 17 are wider. In this case, the damper areas 301 may be provided only on the first common supply channels 17 with a larger channel width. In this case, too, the width of the second common supply channels 27 may be larger than the width of the second common collection channels 28, equal to the width of the second common collection channels 28, or smaller than the width of the second common collection channels 28.

As mentioned earlier, each liquid ejection head 1 in the present embodiment is provided with a plurality of first common supply channels 17 and a plurality of first common collection channels 18. As described above, in the present embodiment, an example in which the common channels on one side, preferably the first common supply channels 17, are not provided with the damper areas 301 has been discussed. Alternatively, some of the first common supply channels 17 may be provided with a damper area 301. Specifically, of the plurality of first common supply channels 17, at least one first common supply channel 17 may not be provided with a damper area 301, and some of the first common supply channels 17 may be provided with a damper area 301.

<Reasons Why It Is Preferable to Provide Damper Areas on Common Collection Channels>

Next, reasons why it is preferable to provide the damper areas 301 on the first common collection channels 18 will be described. There is a possibility of crosstalk in which a pressure generated in each pressure chamber 5 passes through the individual supply channel 7 and the individual collection channel 8 to the first common supply channel 17 and the first common collection channel 18 and then propagates to other pressure chambers 5. In each liquid ejection head 1 in the present embodiment, in which the ink is circulated from the first common supply channels 17 to the first common collection channels 18 through the pressure chambers 5, the pressure in the first common collection channels 18 is set lower than the pressure in the first common supply channels 17. Accordingly, it is easier for a pressure from a pressure chamber 5 to propagate to the collection channel side, on which the pressure is lower. Also, the higher the flow rate of the ink to be circulated becomes, the greater the pressure difference between the supply channel and the collection channel becomes, and the easier it becomes for a pressure to propagate to the collection channel. Thus, providing the damper areas 301 on the walls of the first common collection channels 18 at positions opposed to the individual collection channels 8 is more effective in suppressing crosstalk. Nonetheless, crosstalk can still be sufficiently suppressed by providing the damper areas 301 only on the common collection channels.

As described above, according to the present embodiment, it is possible to suppress crosstalk while also achieving a proper balance between the damping performance and the liquid flow rate.

Second Embodiment

In the first embodiment, an example has been described in which the damper substrate 302 is included, and the first common supply channels 17 and the first common collection channels 18 are formed in the damper substrate 302. In a second embodiment, an example in which the first common supply channels 17 and the first common collection channels 18 are formed in the liquid supply substrate 203 will be described.

Figure 6:
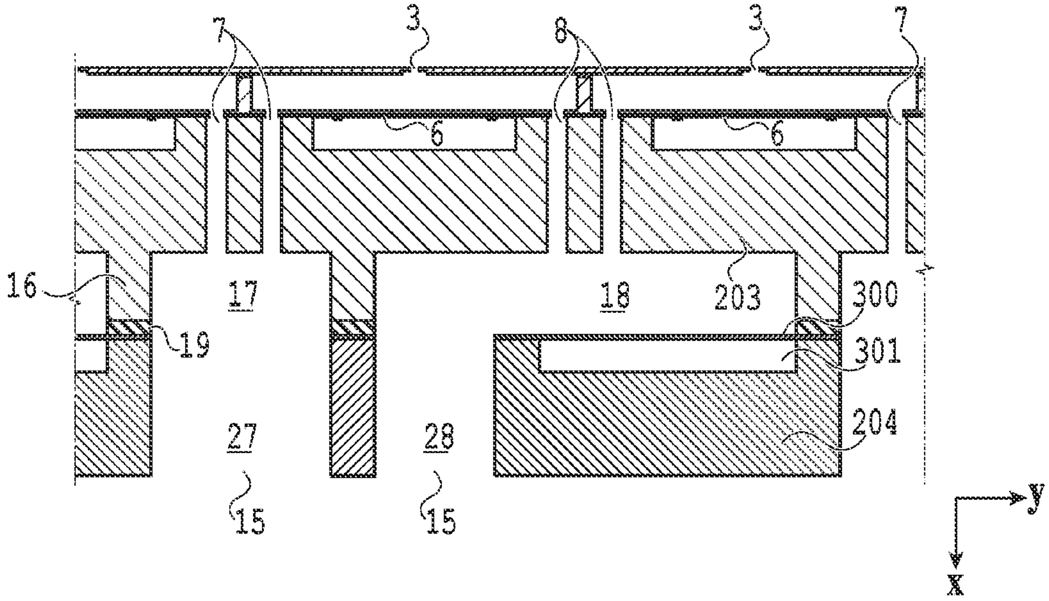
FIG. 6 is a view illustrating a cross section around ejection ports.

FIG. 6 is a view illustrating a cross section around ejection ports 3 in the present embodiment. Like FIG. 5B, FIG. 6 is a view illustrating a cross section indicated by the VB-VB line in FIG. 4. As illustrated in FIG. 6, in the present embodiment, the individual supply channels 7 communicate with the first common supply channels 17 formed in the liquid supply substrate 203. The individual collection channels 8 communicate with the first common collection channels 18 formed in the liquid supply substrate 203.

Moreover, in the present embodiment, the damper member 300 is formed on the channel formation substrate 204. Furthermore, the damper member 300 forms the walls of the first common collection channels 18 formed in the liquid supply substrate 203 which face the individual collection channels 8. In the present embodiment, the damper substrate 302 as described in the first embodiment is omitted by providing the damper member 300 on the channel formation substrate 204.

As described above, each liquid ejection substrate 2 in the present embodiment has a first substrate having the ejection ports 3 formed therein (ejection port formation substrate 201) and a second substrate having the pressure chambers 5 formed therein (vibration substrate 202). The liquid ejection substrate 2 further has a third substrate having the individual supply channels 7, the individual collection channels 8, the first common supply channels 17, and the first common collection channels 18 formed therein (liquid supply substrate 203). The liquid ejection substrate 2 further has a fourth substrate having the second common supply channels 27 and the second common collection channels 28 (channel formation substrate 204). Moreover, the first substrate (ejection port formation substrate 201), the second substrate (vibration substrate 202), the third substrate (liquid supply substrate 203), and the fourth substrate (channel formation substrate 204) are laminated in this order.

The liquid ejection substrate 2 is formed by affixing the substrate having the damper member 300. In the first embodiment, the damper substrate 302 having the damper member 300 is affixed to the liquid supply substrate 203 with the bonding layer 19. In the present embodiment, on the other hand, the channel formation substrate 204 having the damper member 300 is affixed to the liquid supply substrate 203. According to the present embodiment, it is possible to reduce costs and enhance the degree of freedom in design. A description will be given below while comparing with an example of the first embodiment.

In the example of the first embodiment illustrated in FIG. 5B, a distance D represents the distance between an opening of an individual supply channel 7 and the bonding layer 19. The distance D is required to be such a sufficient length that the bonding layer 19, if sticking out, will not close the opening of the individual supply channel 7. The first common supply channels 17 and the first common collection channels 18 are therefore required to be designed with the bonding layer 19 and its sticking area taken into consideration. On the other hand, forming the first common supply channels 17 and the first common collection channels 18 in the liquid supply substrate 203 as in the present embodiment illustrated in FIG. 6 eliminates the possibility of the bonding layer 19 closing openings of the individual supply channels 7 and the individual collection channels 8. This enables each individual channel and each common channel to be formed with a desired design. Also, since the damper substrate 302 is omitted, the number of substrates to be bonded in the forming of the liquid ejection substrate 2 is reduced. Reducing the number of substrates reduces costs, reduces the bonding cost required for bonding of the substrates, and, as mentioned earlier, enhances the degree of freedom in design.

Figure 7:
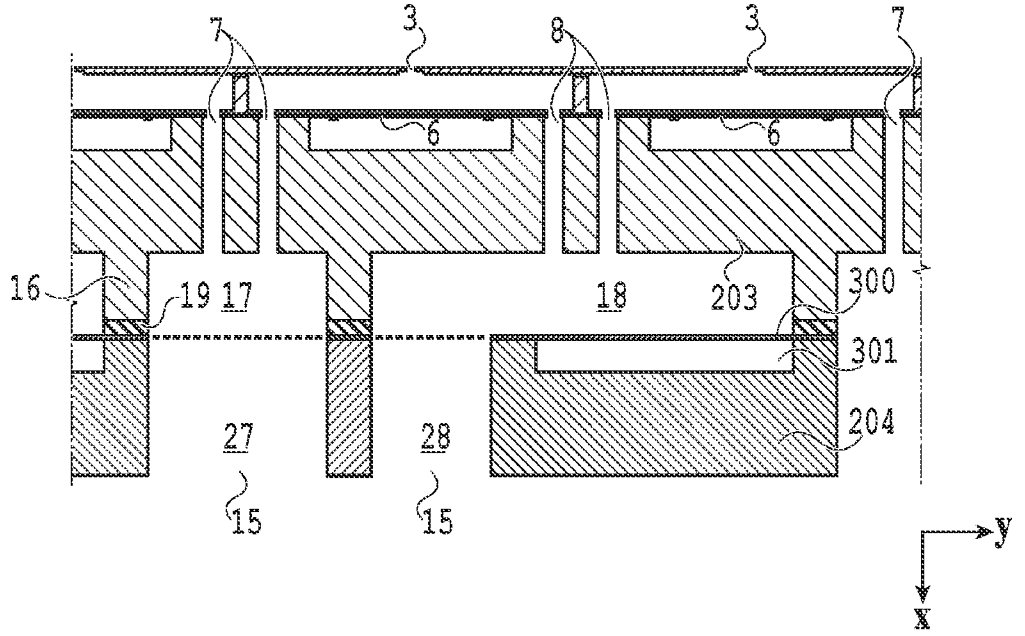
FIG. 7 is a view illustrating a cross section around ejection ports.

FIG. 7 is a view illustrating a modification of the present embodiment. FIG. 7 is a view illustrating a cross section around ejection ports 3, and is a view illustrating a cross section indicated 1*w* the VB-VB line in FIG. 4B. As illustrated in FIG. 7, patterns in which minute holes are formed can be formed at areas of the damper member 300 between the second common supply channels 27 and the first common supply channels 17. In this way, the areas of the damper member 300 where the patterns are formed will function as filters. In the example of FIG. 7, patterns in which minute holes are formed are also provided at areas of the damper member 300 between the second common collection channels 28 and the first common collection channels 18. The filters may be formed only on both the supply side and the collection side as in the example of FIG. 7. Alternatively, the filters formed of the damper member 300 may be formed only between the first common supply channels 17 and the second common supply channels 27 on the supply side. The modification illustrated in FIG. 7 is not limited to the second embodiment. The modification is applicable also to a case of using the damper substrate 302 to form the damper areas 301 as described in the first embodiment. Specifically, in the configuration illustrated in FIGS. 5A and 5B, patterns may be formed at the portions of the damper member 300 between the second common supply channels 27 and the first common supply channels 17 to impart a filtering function. Similarly, in the configuration illustrated in FIGS. 5A and 5B, patterns may be formed at the portions of the damper member 300 between the second common collection channels 28 and the first common collection channels 18 to impart a filtering function.

Figure 9:
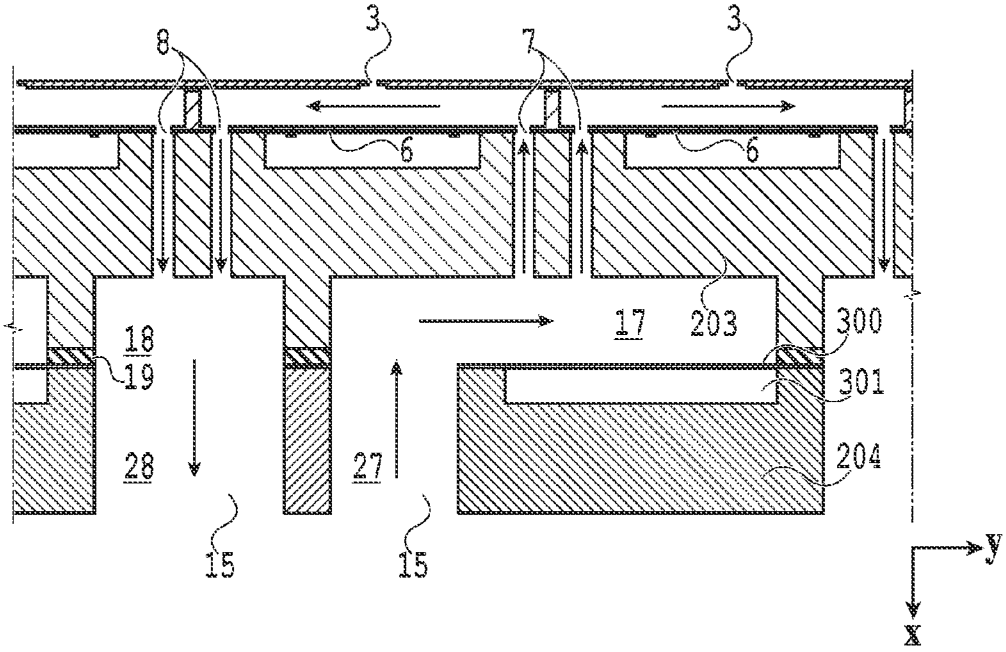
FIG. 9 is a view illustrating a cross section around ejection ports.

In the present embodiment, the configuration may be such that the first common supply channels 17 are provided with the damper areas 301, as described in the first embodiment. FIG. 9 is a view illustrating an example of the present embodiment in which the first common supply channels 17 are provided with the damper areas 301. As illustrated in FIG. 9, even in the case of providing the damper areas 301 only on the common supply channel side, a sufficient damper width can still be provided and crosstalk can therefore be suppressed.

OTHER EMBODIMENTS

In the above embodiments, piezoelectric elements have been exemplarily described as the pressure generating elements that generate a pressure in the pressure chambers. Any elements may be used as the pressure generating elements. For example, heating elements that generate a pressure by generating a bubble by heating may be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-056988, filed Mar. 30, 2022, and No. 2022-082365, filed May 19, 2022, which are hereby incorporated by reference herein in their entirety.

What is claimed is:

1. A liquid ejection head comprising:

an ejection port configured to eject a liquid;

an ejection port array being an array of a plurality of the ejection ports;

a plurality of pressure chambers corresponding respectively to the plurality of ejection ports and communicating with the ejection ports;

a plurality of individual supply channels corresponding respectively to the plurality of pressure chambers and communicating with the pressure chambers;

a plurality of individual collection channels corresponding respectively to the plurality of pressure chambers and communicating with the pressure chambers;

a common supply channel communicating with the plurality of individual supply channels, the common supply channel communicating with surfaces of the individual supply channels opposite to surfaces thereof communicating with the pressure chambers;

a common collection channel communicating with the plurality of individual collection channels, the common collection channel communicating with surfaces of the individual collection channels opposite to surfaces thereof communicating with the pressure chambers; and a damper member forming a wall of a part of a channel in the common collection channel, wherein a wall of a part of a channel in the common supply channel is not formed by the damper member, the common supply channel and the common collection channel are formed so as to extend in a first direction along the ejection port array, the common supply channel and the common collection channel are disposed side by side in a second direction crossing the ejection port array, and the individual supply channels and the individual collection channels are formed so as to extend in a direction crossing the first direction and the second direction.

2. The liquid ejection head according to claim 1, wherein the width of the common collection channel in the second direction is wider than the width of the common supply channel in the second direction.

3. The liquid ejection head according to claim 1, wherein a plurality of the ejection port arrays are formed side by side in the second direction, a plurality of the common supply channels and a plurality of the common collection channels are provided and are disposed alternately in the second direction, and a wall of a part of at least one of the plurality of common supply channels is not formed by the damper member.

4. The liquid ejection head according to claim 1, wherein a length of the ejection port array is shorter than a length of the damper member in the first direction.

5. The liquid ejection head according to claim 1, further comprising:

a first substrate having the ejection ports formed therein;

a second substrate having the pressure chambers formed therein;

a third substrate having the individual supply channels and the individual collection channels formed therein;

a fourth substrate including the damper member at the part of the channel in the common collection channel and having the common supply channel and the common collection channel formed therein; and a fifth substrate having a second common supply channel and a second common collection channel formed therein, the second common supply channel communicating with the common supply channel, the second common collection channel communicating with the common collection channel, wherein the first substrate, the second substrate, the third substrate, the fourth substrate, and the fifth substrate are laminated in this order.

6. The liquid ejection head according to claim 5, wherein the fifth substrate includes:

a through-hole penetrating through a first surface to be laminated to the fourth substrate and a second surface being an opposite surface to the first surface, and a recess formed in the first surface, and the through-hole and the recess are disposed side by side in the second direction.

7. The liquid ejection head according to claim 5, further comprising a bonding layer provided between the third substrate and the fourth substrate.

8. The liquid ejection head according to claim 7, wherein the bonding layer is provided between the third substrate and a partition separating the common supply channel and the common collection channel in the fourth substrate.

9. The liquid ejection head according to claim 1, further comprising:

a first substrate having the ejection ports formed therein;

a second substrate having the pressure chambers formed therein;

a third substrate having the individual supply channels, the individual collection channels, the common supply channel, and the common collection channel formed therein; and a fourth substrate including the damper member at the part of the channel in the common collection channel and having a second common supply channel and a second common collection channel formed therein, the second common supply channel communicating with the common supply channel, the second common collection channel communicating with the common collection channel, wherein the first substrate, the second substrate, the third substrate, and the fourth substrate are laminated in this order.

10. The liquid ejection head according to claim 9, wherein the fourth substrate includes:

a through-hole penetrating through a first surface to be laminated to the third substrate and a second surface opposite to the first surface, and a recess formed in the first surface, and the through-hole and the recess are disposed side by side in the second direction.

11. The liquid ejection head according to claim 10, wherein the fourth substrate includes the damper member on the first surface to be laminated to the third substrate.

12. The liquid ejection head according to claim 9, further comprising a bonding layer provided between the third substrate and the fourth substrate.

13. The liquid ejection head according to claim 12, wherein the bonding layer is provided between the fourth substrate and a partition separating the common supply channel and the common collection channel in the third substrate.

14. The liquid ejection head according to claim 1, wherein the damper member includes an area with a pattern in which a hole is formed.

15. The liquid ejection head according to claim 14, wherein the area with the pattern is formed at a position other than the walls of the parts of the channels in the common collection channel and the common supply channel.

16. A liquid ejection head comprising:

an ejection port configured to eject a liquid;

an ejection port array being an array of a plurality of the ejection ports;

a plurality of pressure chambers corresponding respectively to the plurality of ejection ports and communicating with the ejection ports;

a plurality of individual supply channels corresponding respectively to the plurality of pressure chambers and communicating with the pressure chambers;

a plurality of individual collection channels corresponding respectively to the plurality of pressure chambers and communicating with the pressure chambers;

a common supply channel communicating with the plurality of individual supply channels, the common supply channel communicating with surfaces of the individual supply channels opposite to surfaces thereof communicating with the pressure chambers; and a common collection channel communicating with the plurality of individual collection channels, the common collection channel communicating with surfaces of the individual collection channels opposite to surfaces thereof communicating with the pressure chambers, wherein the common supply channel and the common collection channel have different widths in a second direction crossing a first direction along the ejection port array, and a wall of a part of the common supply channel or the common collection channel, whichever has a wider width in the second direction, is formed by the damper member, and the individual supply channels and the individual collection channels are formed so as to extend in a direction crossing the first direction and the second direction.

17. A liquid ejection apparatus configured such that a liquid ejection head is mountable thereon, the liquid ejection head comprising:

an ejection port configured to eject a liquid;

an ejection port array being an array of a plurality of the ejection ports;

a plurality of pressure chambers corresponding respectively to the plurality of ejection ports and communicating with the ejection ports;

a plurality of individual supply channels corresponding respectively to the plurality of pressure chambers and communicating with the pressure chambers;

a plurality of individual collection channels corresponding respectively to the plurality of pressure chambers and communicating with the pressure chambers;

a common supply channel communicating with the plurality of individual supply channels, the common supply channel communicating with surfaces of the individual supply channels opposite to surfaces thereof communicating with the pressure chambers;

a common collection channel communicating with the plurality of individual collection channels, the common collection channel communicating with surfaces of the individual collection channels opposite to surfaces thereof communicating with the pressure chambers; and a damper member forming a wall of a part of a channel in the common collection channel, wherein a wall of a part of a channel in the common supply channel is not formed by the damper member, the common supply channel and the common collection channel are formed so as to extend in a first direction along the ejection port array, the common supply channel and the common collection channel are disposed side by side in a second direction crossing the ejection port array, and the individual supply channels and the individual collection channels are formed so as to extend in a direction crossing the first direction and the second direction.

* * * * *